United States Patent [19]

Huntley

[11] Patent Number: 4,694,299
[45] Date of Patent: Sep. 15, 1987

[54] PORTABLE RADAR SIMULATOR WITH ADJUSTABLE SIDE LOBE GENERATOR

[75] Inventor: William P. Huntley, Old Lyme, Conn.

[73] Assignee: The United States of America as represented by the Secretary of the Navy, Washington, D.C.

[21] Appl. No.: 722,542

[22] Filed: Apr. 12, 1985

[51] Int. Cl.[4] .............................................. G01S 7/40
[52] U.S. Cl. .................................................. 342/170
[58] Field of Search ...................... 343/17.7; 434/1, 2; 114/340; 342/165–174, 5, 6, 42, 43, 51, 187, 188

[56] References Cited

U.S. PATENT DOCUMENTS

| | | | |
|---|---|---|---|
| 2,698,432 | 12/1954 | Blasingame et al. | 343/17.7 |
| 2,825,058 | 2/1958 | Rix et al. | 343/17.7 |
| 3,250,923 | 5/1966 | Liska et al. | 343/17.7 |
| 4,008,476 | 2/1977 | Evans, Jr. | 342/169 |

FOREIGN PATENT DOCUMENTS 0813681  3/1981  U.S.S.R. ............................. 343/17.7

OTHER PUBLICATIONS

R. Graf, *Dict. of Electronics*, p. 170; (1974).
Smith et al., "AN/APS-116 Periscope Detecting Radar"; *IEEE Trans. on Aerosp. and Electronic Systems*, (vol. AES-16, No. 191/80; p. 66–73).

Primary Examiner—T. H. Tubbesing
Assistant Examiner—Bernarr Earl Gregory
Attorney, Agent, or Firm—Arthur A. McGill; Prithvi C. Lall; Michael J. McGowan

[57] ABSTRACT

A scan oscillator and a Pulse Repetition Frequency (PRF) oscillator with associated analog and digital circuits provide drive signals for two different RF PIN diode attenuators. When driven by a portable Gunn Diode Oscillator or other microwave source RF is generated that provides main lobe and adjustable side lobe radar signals to a directional microwave antenna. This output signal has adjustable scan rate, beam width, PRF, pulse width, and side lobe level and is self-contained in a package measuring $8\frac{3}{8} \times 7\frac{3}{8} \times 3$ inches. The system allows "on the sail" testing for periscope mounted Direction Finding Systems.

3 Claims, 2 Drawing Figures

PORTABLE RADAR SIMULATOR WITH ADJUSTABLE SIDE LOBE GENERATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention generally relates to simulators for testing equipment. More particularly the inventive device simulates radar signals for the testing of Submarine Direction Finding Systems in the field.

(2) Description of the Prior Art

Accurate testing of Submarine Periscope Direction Finding equipment has previously involved large pieces of equipment that are impractical to use on or near the sail of a submarine. Most available equipment provide simulation of the radar main lobe only. Known simulators that do provide main lobe and side lobe generation are large digitally controlled systems with large keyboard and cathode ray tube monitors. These simulators can only be set up for laboratory testing.

SUMMARY OF THE INVENTION

The present invention has the ability to simulate radar signals for the testing of Submarine Periscope Direction Finding Systems in the field. It provides an output signal that has a main lobe and side lobes that are generated at predetermined intervals. A scan oscillator provides a signal that is operated upon to determine the magnitude of the main and side lobes and is also operated on to determine the frequency with which this output signal is generated. The output signals are in the form of pulsed signals which are provided by a Pulse Repetition Frequency generator.

DESCRIPTION OF THE PREFERRED EMBODIMENT

Figure 1:
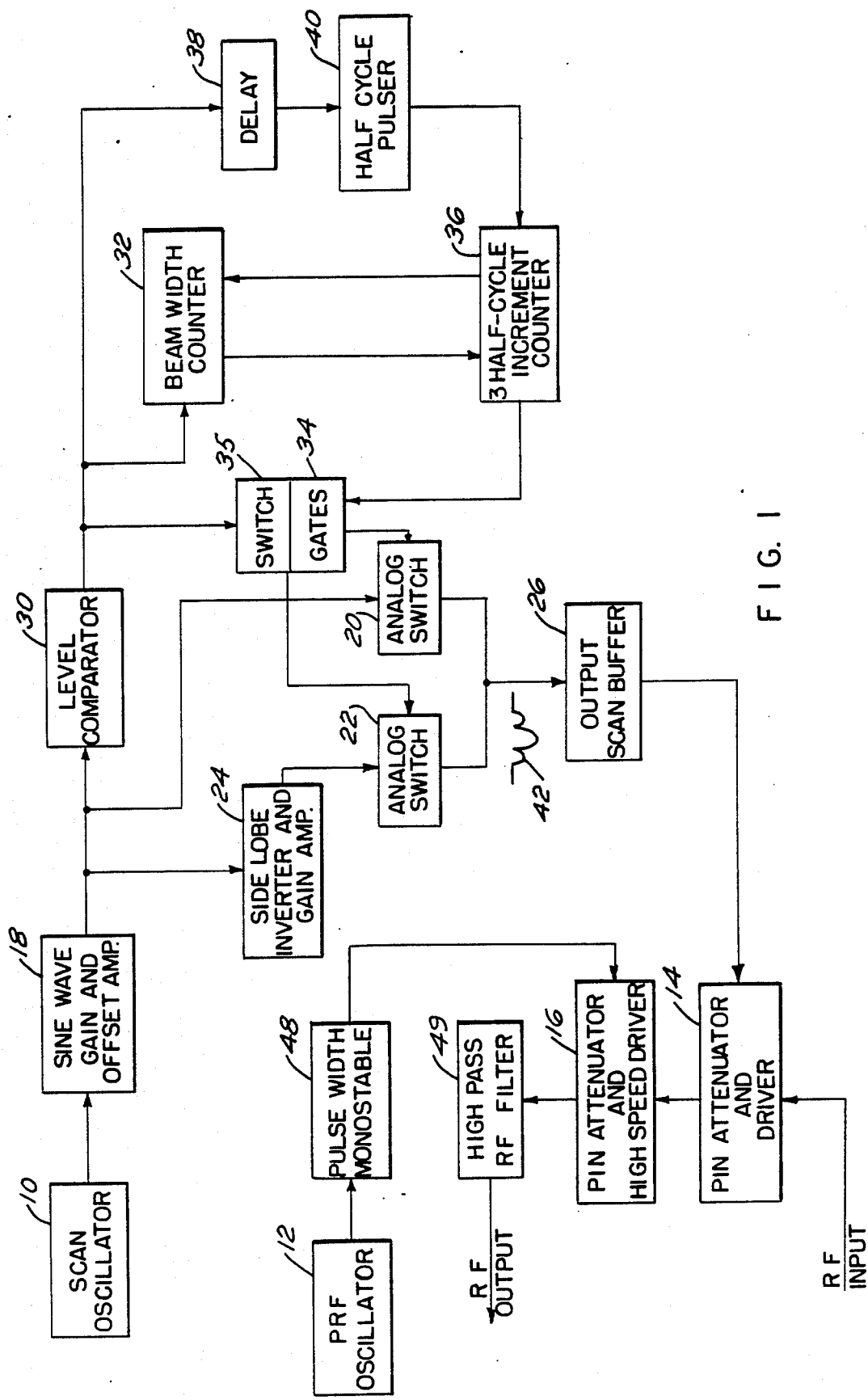
FIG. 1 is a block diagram of a portable radar simulator with adjustable side lobe generator in accordance with the present invention.
Figure 2:
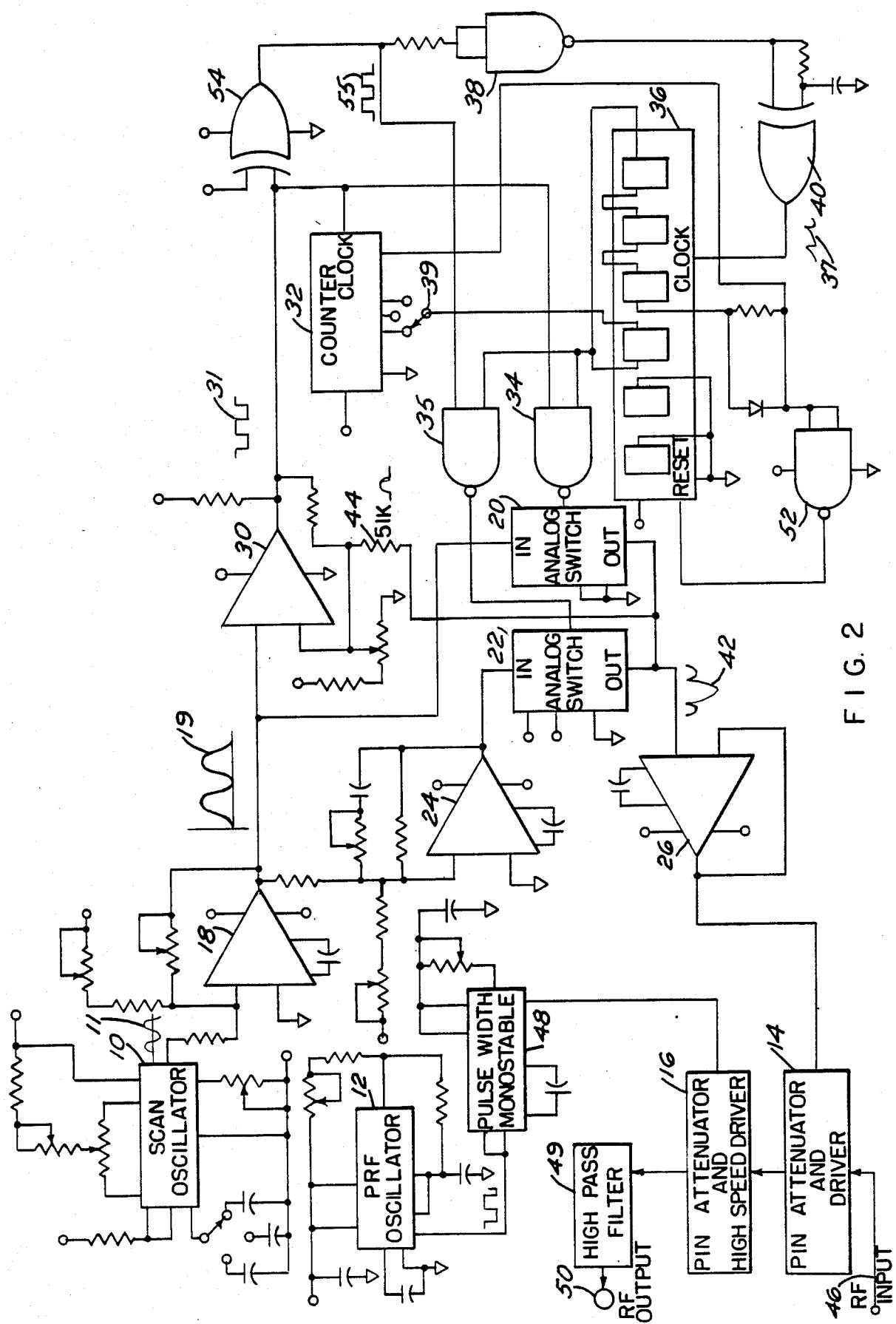
FIG. 2 is a schematic diagram of the simulator of FIG. 1.

Referring now to FIGS. 1 and 2 there is shown respectively a block diagram and a schematic representation of a portable device that simulates radar signals for the testing of Submarine Direction Finding Systems. The invention comprises a pair of oscillators including a scan oscillator 10 and a pulse repetition frequency oscillator 12 that provide drive signals for respective RF PIN diode attenuators 14 and 16 through associated analog and digital circuits.

Scan oscillator 10 produces a low frequency sine wave 11 for providing a radar scan shape. This signal from oscillator 10 is conducted to an amplifier 18 that has amplification and D.C. offset capability. The amplifier 18 provides an output sine wave signal 19 that is sent directly to analog switch 20 and in addition is sent to analog switch 22 after being inverted, offset, and attenuated by inverter 24. This places analog switches 20 and 22 receiving signals 180° out of phase with each other. Analog switch 20 provides a main lobe signal and analog switch 22 provides side lobe signals. Both analog switches 20 and 22 provide output signals on the negative half cycle and in a sequence to be explained later. The sequence provides for a typical pattern with a main lobe having a side lobe on both sides. The output signals from switches 20 and 22 are conducted to buffer amplifier 26. The output of buffer amplifier 26 drives the RF PIN attenuator and driver 14.

For controlling the above sequence, amplifier 18 provides a signal 19 to level comparator 30. Pulses 31 from comparator 30 are applied directly to the clock input of beamwidth counter 32 and to an input of NAND gate 34. Inverted pulses 55 from comparator 30 are applied to an input of NAND gate 35 through Exclusive OR gate 54 functioning as an inverter. Signal 37 is applied to the clock input of increment counter 36 through the series combination of Exclusive OR gate 54, NAND gate 38 that has a Schmitt trigger input and Exclusive OR gate 40. Selected output signals from counter 32 are also fed to increment counter 36 by switch 39. Upon receipt of selected output signals from counter 32 and a predetermined count of pulses received at its CLOCK input, the counter 36 sends an enabling signal to NAND gates 34 and 35 that permits the operation of switches 20 and 22 upon receipt of appropriate signals at their other input.

When in operation a positive pulse is sent from comparator 30, it is received by gate 34. However, this same positive pulse is inhibited by Exclusive OR circuit 54. Exclusive OR circuit 54 sends out a positive pulse to gate 35 only when the signal from comparator 30 goes LOW. This means that gates 34 and 35 receive positive pulses emanating from comparator 30 on alternate half-cycles or in other words the HIGH and LOW signals they receive are 180° out of phase with each other. Gates 34 and 35 also receive signals from counter 36 as mentioned previously. Gates 34 and 35 when signals on both inputs are HIGH send enabling LOW signals to respective switching gates 20 and 22. When a predetermined count is reached on counters 32 and 36 an enabling HIGH signal is sent from counter 36 to gates 34 and 35 for one and one-half cycles. During this one and one-half cycle gates 34 and 35 send enabling LOW signals only when the other input is also HIGH. The count is set so as to permit gate 35 to send an enabling LOW signal on the first half cycle, gate 34 to send an enabling LOW signal on the second half cycle and gate 35 to again send an enabling LOW signal on the third half cycle. At this point both counters 32 and 36 reset with counter 36 sending out a LOW signal to both gates 34 and 35 thereby inhibiting further operation of gates 34 and 35 until a future predetermined one and one-half cycles is reached that again has counter 36 sending a HIGH signal to gates 34 and 35. When gate 35 operates, enabling switch 22 passes an inverted sidelobe signal from inverter 24. One half cycle later gate 34 operates, enabling switch 20 to pass an inverted main lobe signal directly from amplifier 18. On the next half cycle gate 35 operates again enabling switch 22 to pass another inverted sidelobe signal from inverter 24. Switches 20 and 22 are never enabled at the same time but both are inhibited between operational sequences.

After sending the signal to gates 34 and 35 for a predetermined count the counter 36 resets itself and provides a signal resetting counter 32 allowing the counting sequence to start again. The reset signal from counter 36 is a positive going signal that is applied instantaneously to itself after passing through inverter 52 that has a NAND gate with a Schmitt trigger input and applied instantaneously to counter 32 without inversion. Inverter 52 has built in capacitance that provides a slow time constant for rearming the counters 32 and 36 to ensure that the reset pulse is long enough.

Amplifier 26 receives the output signals of switches 20 and 22 and amplifies them in order to drive the PIN attenuator and driver 14. The 51K ohm resistor 44 from amplifier 30 to the output summing point of switches 20 and 22 causes the upper voltage of the switch off state of the inverted signal 42 to be four volts. The PIN attenuator and driver 14 receives an RF input on line 46. PIN attenuator 14 in effect also inverts the main and side lobes of the signal from amplifier 26 in modulating the RF input 46.

Variable Pulse Repetition Frequency generator 12, produces negative going pulses which drive pulse width monostable 48 to produce positive going variable pulse widths which are used to drive the PIN attenuator and high speed driver 16. PIN attenuator and driver 16 also receives the modulated signal from PIN attenuator and driver 14. PIN attenuator and driver 16 provides a pulsed signal to high pass filter 49 that provides an RF output 50.

There has therefore been described a device that allows "on the sail" testing for periscope mounted Direction Finding Systems. The device provides for adjustable main and side lobe signals. Its compact size and stand alone operation make its use highly desirable for the fleet.

It will be understood that various changes in details, materials, steps and arrangement of parts, which have been herein described may be made by those skilled in the art within the principle and scope of the invention as expressed in the appended claims.

What is claimed is:

1. A portable radar simulator for generating a pulsed RF signal adapted to be provided to a directional microwave antenna comprising:
    a scan oscillator for providing a sine wave signal;
    shaping means for receiving said sine wave signal and for providing a plurality of electrical signals that simulate a main lobe and a side lobe on each side of said main lobe, said shaping means further comprises main lobe generation means connected to said scan oscillator for receiving said sine wave signals and for providing a main lobe at predetermined intervals, and side lobe generator means connected to said scan oscillator for receiving said sine wave signal and for providing a side lobe immediately prior to and immediately following said main lobe;
    variable pulse width generator means for providng pulse signals;
    modulating means for receiving said plurality of electrical signals simulating main lobe and side lobe on each side of said main lobe from said shaping means and an RF input signal and for providing a modulated RF signal; and
    high speed driver means connected to receive said modulated RF signal and said pulse signals for providing a pulsed RF output.

2. A radar simulator according to claim 1 wherein said main lobe generation means further comprises:
    counting means connected to said scan oscillator for receiving said sine wave signal and for providing output signals at predetermined intervals; and
    switching means connected to said scan oscillator for receiving said sine wave signal and said counting means output signals for gating portions of said sine wave signal at intervals determined by said counting means output signals.

3. A radar simulator according to claim 2 wherein said side lobe generator means further comprises:
    counting means connected to said scan oscillator for receiving said sine wave and for providing output signals at predetermined intervals;
    inverter and gain amplifier means connected to said scan oscillator to receive said sine wave signal for operating on said received signal and providing output signal; and
    switching means connected to said counting means for receiving said counting means output signal and to said inverter and gain amplifier means for receiving inverter and gain amplifier output signals for gating portions of said inverter and gain amplifier means output signals determined by said counting means output.

* * * * *